United States Patent [19]

Greer

[11] Patent Number: 4,591,748

[45] Date of Patent: May 27, 1986

[54] ELECTRONICALLY POWERED APPARATUS FOR IMPARTING VIBRATORY FORCES ON A TREE

[76] Inventor: John W. Greer, 5013 Inland Ave., Modesto, Calif. 95351

[21] Appl. No.: 483,885

[22] Filed: Apr. 11, 1983

[51] Int. Cl.$^4$ .............................................. H02K 7/06
[52] U.S. Cl. .......................................... 310/81; 310/91; 211/1.5
[58] Field of Search ............................ 310/81, 74, 91; 318/443; 248/511; 40/455; 211/1.5, 107; 362/806, 123

[56] References Cited

U.S. PATENT DOCUMENTS

| | | | |
|---|---|---|---|
| 1,027,403 | 5/1912 | Darling | 310/81 |
| 1,127,987 | 2/1915 | Green | 248/511 |
| 1,943,659 | 1/1934 | Eason | 211/1.5 |
| 2,399,503 | 4/1946 | Ott | 310/81 |
| 2,522,906 | 9/1950 | Smith | 41/15 |
| 2,587,788 | 3/1952 | Tacy | 248/45 |
| 3,119,586 | 1/1964 | Hoffman | 248/511 |
| 3,431,410 | 3/1969 | Dolan | 240/10.1 |
| 4,107,588 | 8/1978 | Seiler | 318/443 |
| 4,180,932 | 1/1980 | Millard | 40/455 |
| 4,326,161 | 4/1982 | Kreinberg | 323/299 |

FOREIGN PATENT DOCUMENTS 134637 5/1981 Japan ..................... 310/74

Primary Examiner—Patrick R. Salce
Assistant Examiner—D. L. Rebsch
Attorney, Agent, or Firm—Christensen, O'Connor, Johnson & Kindness

[57] ABSTRACT

A tree vibrator (8) includes an electric motor (14) disposed within a housing (15) mounted on tree (10) by band clamp (18). An adjustable eccentric weight assembly (24) is mounted on the rotary output shaft (26) of motor (14) to impart vibrations of a desired intensity on tree (10). Motor (14) is powered by battery assembly (49) through an intermediate electronic power control circuit assembly (56) to intermittently energize motor (14), significantly extending the useful life of batteries (50) of assembly (49).

2 Claims, 6 Drawing Figures

ELECTRONICALLY POWERED APPARATUS FOR IMPARTING VIBRATORY FORCES ON A TREE

TECHNICAL FIELD

The present invention relates to a tree vibrator and more particularly to an apparatus for imparting vibratory forces on a Christmas tree to enhance the decorative appearance of the tree.

BACKGROUND ART

It is known to mount Christmas tree on a stand assembly having an electric motor and an appropriate drive mechanism for rotating the tree about a vertical axis to improve the aesthetic appearance of the tree. Such strands are rather complicated in construction and relatively expensive to manufacture. Moreover, adequate clearance must be provided between the tree and adjacent walls or furniture to avoid hitting the longest limbs of the tree. In addition, care must be taken to ensure that small children and pets do not grab the limbs of the rotating tree. Examples of such tree stand assemblies are disclosed by U.S. Pat. Nos. 1,943,659 and 2,587,788.

The prior art also includes Christmas tree vibrators powered by standard household current. These vibrators typically include an electric motor secured to the trunk of the tree and an eccentric weight mounted on the rotating output shaft of the motor. The rotation of the eccentric weight imparts vibratory forces on the Christmas tree giving it a swaying appearance. A drawback of this type of tree vibrator is that it requires the use of household current, which could produce an electrical shock or a fire-igniting spark if a defect exists in the motor or electric cord. Also, the Christmas tree must be located close to an electrical outlet, which may not always be conveniently available.

To overcome the above-discussed drawbacks of known tree vibrators and rotating tree stands, the present invention provides a battery-powered Christmas tree vibrator, which includes a novel power control circuit to intermittently energize an electric motor, thereby drastically reducing the electrical power needed to rotate an eccentric weight assembly. As a result, the batteries are capable of powering the tree vibrator for extended periods of time before they must be replaced. By utilizing the battery powered tree vibrator of the present invention, a shimmering motion is imparted to the branches of the tree to greatly enhance the appearance of the tree and to cause the tinsel and ornaments on the tree to reflect the room or natural light, thus eliminating the need for Christmas tree lights. As a consequence, household current is not required to power the Christmas tree lights, thereby reducing the danger of a fire accidentally being caused by the heat produced by the Christmas tree lights.

SUMMARY OF THE INVENTION

The Christmas tree vibrator of the present invention includes an electric motor mounted within a housing which in turn is rigidly secured to the trunk of a Christmas tree by appropriate mounting means. An eccentric weight assembly is attached to the output shaft of the electric motor to impart vibratory forces on the Christmas tree as the weight assembly rotates. In one preferred form of the present invention, the mounting means includes an adjustable diameter band clamp. In another preferred embodiment of the present invention, the mounting means includes a collar affixed to the housing and engageable around the diameter of the tree trunk. The collar is provided with a threaded through-opening for receiving an elongate threaded shaft having a foot member secured to its radially inward end to push against the tree trunk to securely attach the collar to the tree trunk.

According to another aspect of the present invention, the eccentric weight assembly includes an elongate, nominally straight, pliable shaft mounted on the output shaft of the electric motor. The pliability of the eccentric weight shaft enables the shaft to be bent at a desired location along its length to vary the magnitude of the eccentric weight. In an alternative typical embodiment of the present invention, the eccentric weight assembly may include a threaded shaft transversely secured to the electric motor output shaft. Weight members having threaded bores may be positioned at selected locations along the length of the transverse shaft to vary the magnitude of the eccentric weight.

According to a further aspect of the invention, electric circuit means are provided for intermittently connecting the battery means with the electric motor for short-duration time intervals. The time intervals during which the electric motor is energized are spaced close enough together so that the output shaft of the electric motor continually rotates while at the same time greatly extending the length of time that the battery means are capable of powering the tree vibrator of the present invention. The electric circuit includes a switch in the form of a transistor which is disposed between the battery means and the motor. The transistor is periodically activated and deactivated by a timing circuit.

BRIEF DESCRIPTION OF THE DRAWINGS

The details of typical embodiments of the present invention will be described in connection with the accompanying drawings, in which.

DETAILED DESCRIPTION OF THE PREFERRED EMBODIMENT

Figure 1:
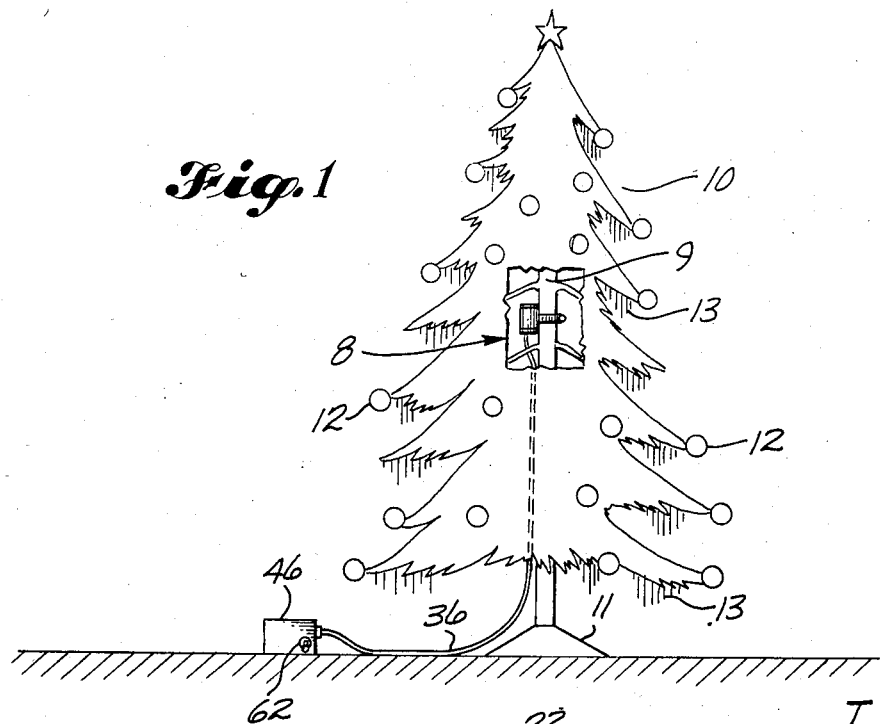
FIG. 1 is a pictorial view of a tree vibrator constructed according to the present invention installed on a Christmas tree.
Figure 2:
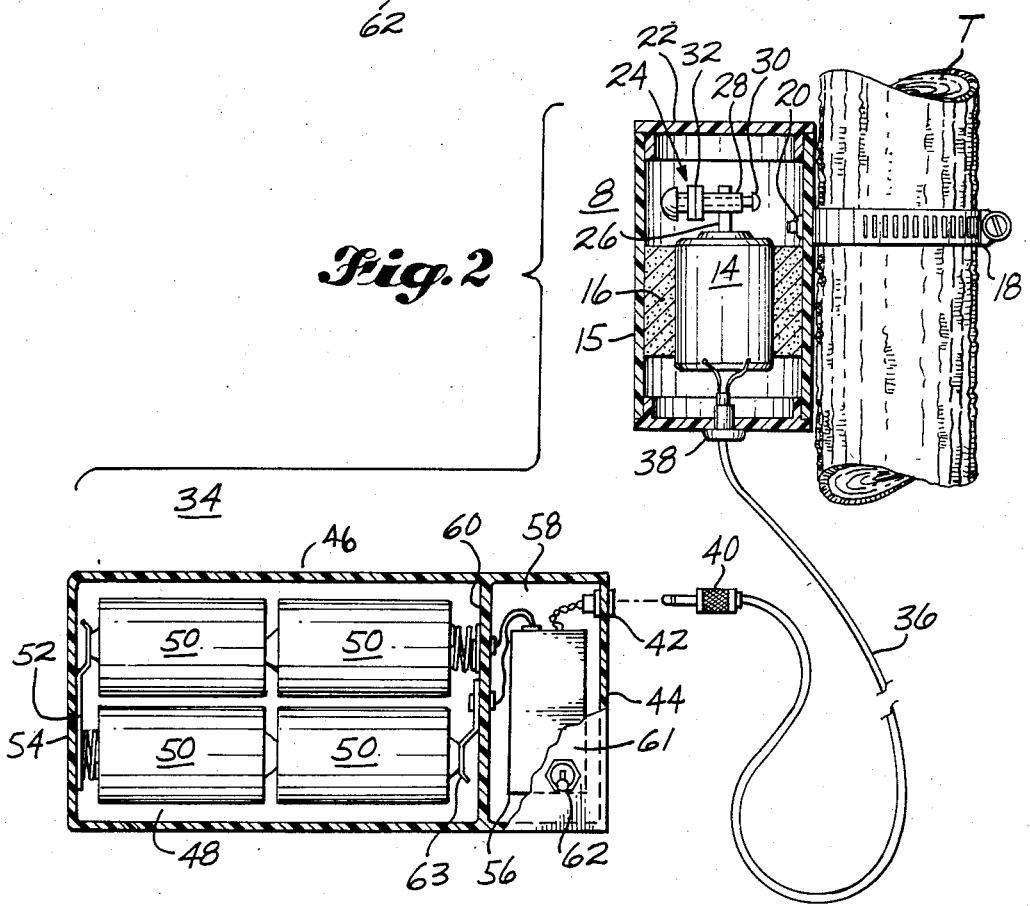
FIG. 2 is a fragmentary, enlarged, partially schematic view of the present invention with the portions broken away for clarity.

Referring initially to FIGS. 1 and 2, a Christmas tree vibrator 8 constructed according to the best mode of the present invention currently known to applicant is shown mounted on the trunk 9 of a Christmas tree 10. Tree 10 can also be a live tree. Tree 10 is mounted on a stationary stand 11 and ornamental bulbs 12 and tinsel 13 are attached to the tree limbs in a typical, well known manner. Vibrator 8 includes an electrically powered motor 14 disposed within a cylindrically shaped housing 15 by a mounting ring 16 formed from rigid foam plastic or other suitable material. Housing 15 is mounted on trunk 9 by a mounting assembly, preferably in the form of an adjustable-diameter band clamp 18 attached to housing 15 by any appropriate means, such as by pop rivets 20. The band clamp rigidly secures housing 15 to tree trunks of different sizes. If desired, an additional band clamp, such as clamp 18, may also be utilized to further secure the housing to the tree trunk.

Housing 15 is fitted with a removable cap 22 to allow access to an eccentric weight assembly 24 mounted on the rotary output shaft 26 of motor 14. In a preferred form of the present invention illustrated in FIG. 2, weight assembly 24 includes a threaded shaft in the form of screw 28 formed with a cross-drilled hole for engaging over motor shaft 26. A threaded bore is longitudinally formed in screw 28 to intersect the cross-drilled hole for reception of a set screw 30 utilized to attach screw 28 securely to motor shaft 26. The location of a pair of lock nuts 32 may be selectively varied along the length of screw 28 to alter the magnitude of the eccentric weight, thereby altering the intensity of the vibrations transmitted to Christmas tree 10. Once the desired position of lock nuts 32 is achieved, cap 22 may be conveniently replaced on housing 15 thereby completely enclosing motor 14 and weight assembly 24 to prevent small children from tampering with vibrator 8 and also to prevent dry tree needles or other relatively easily combustible materials from contacting motor 14.

Alternatively, screw 28, set screw 30, and lock nuts 32 can be replaced with an elongate weight member, not shown, having a weight at one end generally corresponding to the magnitude of the combined weight of the head of screw 28 and lock nuts 32. The other end of the elongate weight can be transversely and permanently attached to motor shaft 26, and cap 22 can be permanently secured to the end of housing 15 to form a completely sealed unit.

Vibrator 8 is energized by electrical power from power pack 34 through a cord 36 which extends through the center of a grommet 38 fitted within an opening formed in the lower end of housing 15. The opposite end of cord 36 includes a plug 40 which is slidably engageable within a socket 42 in a well known manner mounted on end wall 44 of a housing 46. Housing 46 is generally rectangular in shape and is configured to form a compartment 48 for receiving a battery assembly 49 composed of a plurality of batteries 50. The battery assembly includes a terminal assembly 52 mounted on a housing end wall 54 for interconnecting batteries 50 in series in a well known manner. Battery assembly 49 provides electrical power to motor 14 through the intermediacy of a power control circuit assembly 56 disposed within an end compartment 58 separated from battery compartment 48 by an intermediate transverse wall 60. A removable cover 61 is utilized to provide access to battery compartment 48 and to end compartment 58.

Figure 3:
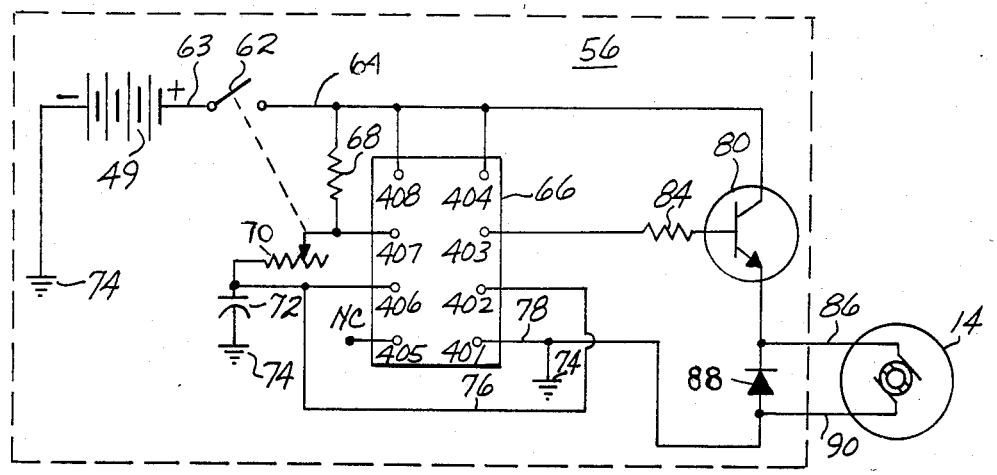
FIG. 3 is a schematic view of the electrical circuit of the present invention.

Additionally referring to FIG. 3, power control circuit assembly 56 includes a manual switch 62 disposed within a rail line 64 interconnecting a positive terminal 63 of battery assembly 49 with voltage input pin 408 and reset pin 404 of an integrated reset timing circuit 66. Closure of switch 62 also interconnects battery assembly 49 with discharge pin 407 and threshold pin 406 through a resistor 68 and a variable resistor 70 wired in series together. A capacitor 72 is connected between variable resistor 70 and a ground 74. Trigger pin 402 of timing circuit 66 is connected to pins 406 and 407 through line 76, and ground pin 401 is connected to ground 74 by line 78. Output pin 403 of timing circuit 66 is interconnected to the base of a transistor 80 through a resistor 84. Preferably, transistor 80 is a NPN-type silicon transistor capable of switching a minimum of one-ampere current. The collector of transistor 80 is connected to battery assembly 49 through switch 62 while the emitter is connected to motor 14 through lead 86. A diode 88 is interposed between the two motor leads 86 and 90 to prevent voltage transients from damaging integrated circuit 66 or transistor 80.

In the operation of power control circuit assembly 56, pins 406 and 401 of timing circuit 66 are normally short-circuited internally within the timing circuit to prevent a charge from building up from within capacitor 72. When switch 62 is closed, the resulting signal to trigger pin 402 causes an internal transistor (not shown, connected between discharge pin 407 and ground) to be switched off, thereby releasing a short circuit across capacitor 72 and producing a higher output signal at output pin 403, which activates transistor 80 to in turn power motor 14. At the same time, capacitor 72 charges through resistors 68 and 70 until it reaches two-thirds of the rail voltage existing at input pin 408 at which time the transistor, not shown, connected to pin 407 is switched to ground, thereby rapidly discharging capacitor 72, which drives output pin 403 back down to its low state, thereby switching off transistor 80 to terminate the flow of electrical current to motor 14. The discharge of capacitor 72 and the reduction of the output signal at pin 403 back down to its low state is sensed by reset pin 404 which resets circuit 66 to repeat the above-described cycle after a certain time interval, dependent upon the value of resistor 70. This cycle is repeated until switch 62 is opened which shuts down power control circuit 56.

The speed with which capacitor 72 changes, and thus the length of time in which transistor 80 is activated, depends in part upon the combined value of resistors 68 and 70 which in turn is controlled by adjusting variable resistor 70. Since the value of variable resistor 70 also controls the length of time between duty cycles of timing circuit 66, the adjustment of this resistor value fixes the proportion of time motor 14 is operated, which in turn affects the operational life of batteries 50 and to some extent the rotational speed of motor 14. The particular values of resistors 68 and 70 can be selected so that transistor 80 is switched at a high enough frequency to operate motor 14 at essentially constant speed while also deactivating the transistor for a great enough proportion of time so that the useful life of batteries 50 is greatly extended relative to the operation life of the batteries if they are directly connected to motor 14 without utilizing power control circuit 56. Moreover, utilizing silicon transistor 80 to switch motor 14 on and off results in high operating efficiency of circuit assembly 56.

Typical components comprising power control circuit 56 are listed below on Table I.

Figure 4:
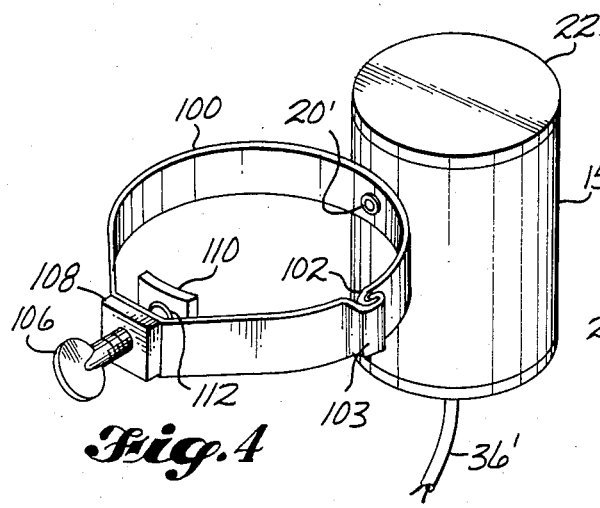
FIG. 4 is an enlarged fragmentary isometric view of an alternative embodiment of the present invention specifically illustrating an alternative manner for mounting the electric motor on a tree trunk.

An alternative typical assembly for mounting a housing 15' on tree 10 is illustrated in FIG. 4. The mounting assembly includes a collar 100 attached to housing 15' by any appropriate means, such as by pop rivet 20'. Collar 100 includes a curved female end portion 102 and a corresponding curved male end portion 103, which is detachably engageable with the female end portion once the collar has been placed around the tree trunk at the desired location. The mounting assembly also includes a wing screw 106, which engages with a lug 108 affixed to the outer surface of a flattened portion of collar 100. A presser foot 110 is attached to the free end of wing screw 106 to bear against the side of the tree trunk as the wing screw is advanced through lug 108. Preferably, the free end of wing screw 106 is enlarged, not shown, to rotatably engage within a socket 112 formed on presser foot 110 to allow the presser foot to remain stationary while the wing screw is rotated. Although not essential, preferably presser foot 110 is formed with an arcuate curvature to approximate the curvature of the trunk of the tree.

Figure 5:
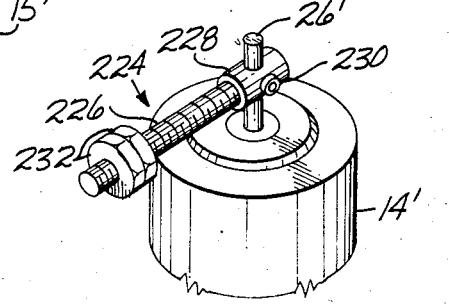
FIG. 5 is an enlarged, fragmentary isometric view of the present invention illustrating a typical alternative eccentric weight assembly.

FIG. 5 illustrates an alternative typical weight assembly 224 which is mounted on the rotary output shaft 26' of motor 14'. Weight assembly 224 includes an elongate threaded shaft 226, which is secured to an attachment collar 228 formed with a cross-drilled hole for engaging over a motor output shaft 26'. Collar 228 is formed with a threaded cross hole for reception of a set screw 230, which securely attached the collar to the motor output shaft 26'. Weight assembly 224 also includes a pair of lock nuts 232, which may be selectively positioned along the length of shaft 226 to vary the magnitude of the eccentric weight, thereby altering the intensity of the vibrations transmitted to tree 10 to achieve the desired swaying effect of the tree.

Figure 6:
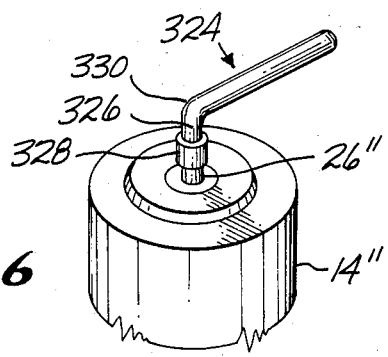
FIG. 6 is a view similar to FIG. 5 illustrating a further typical eccentric weight assembly.

FIG. 6, illustrates a further typical eccentric weight assembly 324 of the present invention shown mounted on the rotary output shaft 26" of motor 14". Weight assembly 324 includes a pliable, nominally straight shaft 326 permanently secured to motor shaft 26" by an attachment collar 328. Shaft 326 is constructed from pliable material permitting the shaft to be bent at a desired location, such as at 330, thereby to alter the magnitude of the eccentric weight to impart the desired vibrational intensity on tree 10. When utilizing the tree vibrator of the present invention on a different size tree, shaft 326 may be conveniently straightened and then bent at a different location along its length.

As will be apparent to those skilled in the art to which it is addressed, the present invention may be embodied in particular forms and in embodiments other than those specifically here disclosed, without departing from the spirit or essential characteristics of the invention. The particular embodiments of tree vibrator 8, eccentric weight assemblies 24, 224 and 324, and housing mounting assemblies, described above, are therefore to be considered in all respects as illustrative and not restrictive, the scope of the present invention is as set forth in the appended claims rather than being limited to the examples of the present invention set forth in the foregoing description.

TABLE I

| Typical Components | |
| --- | --- |
| Reference Designation | Description |
| 66 | NE555 |
| 68 | 5K ohm, ¼ watt, 5 percent |
| 70 | 5K ohm, ¼ watt, 5 percent |
| 72 | 1 uf |
| 80 | 2N2222 |
| 82 | 1N4002 |
| 84 | 4.7K ohm, ¼ watt, 5 percent |
| 88 | 1N4002 |
| 92 | .01 f |

I claim:

1. An apparatus for imparting vibratory forces on a tree, comprising:
   (a) an electric motor having a rotary output shaft;
   (b) means for mounting said electric motor on the trunk of the tree;
   (c) eccentric weight means secured to said motor output shaft;
   (d) battery means for energizing said electric motor;
   (e) electric power control circuit means for automatically, intermittently interconnecting said battery means with said electric motor for closely spaced, short-duration time intervals; said power control circuit means includes:
      a switch operably disposed between said battery means and said motor; and,
      control means for opening and closing said switch at a cyclic rate, said control means including manually operable means for varying said cyclic rate to effect substantially continuous rotation of the output shaft of said electric motor at a selected speed for inducing a desired level of vibration on the tree; and
   (f) wherein said eccentric weight means includes an elongate, nominally straight, pliable shaft, said shaft being bendable at a desired location along its length to vary the magnitude of the eccentric weight.

2. An apparatus for imparting vibratory forces on a tree, comprising:
   (a) an electric motor having a rotary output shaft;
   (b) means for mounting said electric motor on the trunk of the tree;
   (c) eccentric weight means secured to said motor output shaft;
   (d) battery means for energizing said electric motor;
   (e) electric power control circuit means for automatically, intermittently interconnecting said battery means with said electric motor for closely spaced, short-duration time intervals; said power control circuit means includes:
      a switch operably disposed between said battery means and said motor; and,
      control means for opening and closing said switch at a cyclic rate, said control means including manually operable means for varying said cyclic rate to effect substantially continuous rotation of the output shaft of said electric motor at a selected speed for inducing a desired level of vibration on the tree; and
   (f) wherein said mounting means comprises:
      a collar affixed to said motor and engageable around the diameter of the trunk of the tree, said collar including portions defining a threaded opening extending radially through said collar; and,
      radially adjustable presser foot means having:
         an elongate threaded shaft engaged with said collar threaded opening;
         a manually graspable handle secured to the radially outward end of said threaded shaft to facilitate manual rotation of said shaft;
         a foot member secured to the radially inward end portion of said threaded shaft for pushing against the trunk of a tree to rigidly mount said mounting means on tree trunks of different diameters; and,
         joint means disposed between the radially inward end of said threaded shaft and said foot member to permit said foot member to remain rotationally stationary against the tree truck while said shaft is rotated relative to said collar to adjust the radial position of said foot member.

* * * * *